United States Patent [19]

Hata

[11] Patent Number: 4,717,997
[45] Date of Patent: Jan. 5, 1988

[54] ABNORMAL CONDITION DETECTIVE CIRCUIT FOR A SWITCHING REGULATOR

[75] Inventor: Yoshitaka Hata, Higashi-Murayama, Japan

[73] Assignee: Kabushiki Kaisha Toshiba, Kanagawa, Japan

[21] Appl. No.: 920,591

[22] Filed: Oct. 20, 1986

[30] Foreign Application Priority Data

Oct. 23, 1985 [JP] Japan .............................. 60-161331[U]

[51] Int. Cl.⁴ ............................................ H02H 7/122
[52] U.S. Cl. ...................................... 363/56; 361/92; 340/661
[58] Field of Search ..................................... 363/20–21, 363/56, 97; 340/660, 661, 662, 663; 361/90, 91, 92

[56] References Cited

U.S. PATENT DOCUMENTS 3,935,511  1/1976  Boulanger et al. ............... 361/92 X
4,099,068  7/1978  Kobayashi et al. ............. 340/663 X
4,323,961  4/1982  Josephson ........................ 363/21 X

FOREIGN PATENT DOCUMENTS 60-93443  6/1985  Japan .

*Primary Examiner*—Peter S. Wong
*Attorney, Agent, or Firm*—Schwartz, Jeffery, Schwaab, Mack, Blumenthal & Evans

[57] ABSTRACT

This detective circuit detects an abnormal drop of an input voltage of a switching regulator of the flyback system. From the secondary winding of the switching regulator, a constant voltage controlled dc voltage is delivered through a diode. This circuit is provided with a peak voltage charging circuit which detects the peak value of a voltage produced in a direction opposite to the forward direction of the diode, and a voltage comparator which compares the peak value with a setting value. Since this peak value is in proportion to the input voltage, the output of the voltage comparator indicates an abnormal drop of the input voltage.

5 Claims, 8 Drawing Figures

ABNORMAL CONDITION DETECTIVE CIRCUIT FOR A SWITCHING REGULATOR

BACKGROUND OF THE INVENTION

The present invention relates to an abnormal condition detective circuit which detects an abnormal drop of an input voltage of a switching regulator of a flyback system.

As control devices or electric machinery become smaller and lighter, simplified switching regulators are desirable to produce a power supply which is also smaller and lighter. Particularly, many switching regulators of the flyback system such as shown in FIG. 1 are employed.

In FIG. 1, a base current $I_B$ is delivered to a transistor 1 from an input dc voltage $V_{in}$ source through a resistor 2. When the transistor 1 is turned on, a current serving as a collector current $I_c$ flows through a winding N1 of a transformer 4 in a direction as shown. As a result, the iron core of the transformer 4 is subjected to excitation, thus producing an induced voltage across winding N2 and N3. As far as the winding N2 is concerned, no current flows therethrough in a direction of the induced voltage produced when the transistor 1 is turned on, with the result that only excitation of the iron core is conducted.

On the other hand, in the circuit including the winding N3, the induced voltage produced when the transistor 1 is turned on is applied to a differentiating circuit comprising a capacitor 5 and a resistor 6, thus allowing an instantaneous current to flow in a direction which increases the base current of the transistor 1.

As shown in FIG. 2, when the transistor 1 is turned on at time $t_1$, the current $I_C$ increases in proportion to time. However, at time $t_2$ determined by various circuit constants, the current $I_C$ decreases, so that an induced voltage is produced across the winding N3 in a direction opposite to that when the transistor 1 was turned on. As a result, the base current of the transistor 1 is rapidly decreased by the differentiating circuit comprising the capacitor 5 and the resistor 6.

Thus, the current $I_C$ is further decreased, so that the transistor 1 is momentarily turned off. As a result, a voltage is produced across the winding N1 in an opposite direction by magnetic flux stored in the iron core of the transformer 4 when the transistor 1 was turned on. Simultaneously with this, a voltage is also produced across the winding N2 in a direction opposite to that when the transistor 1 was turned on, thereby charging a capacitor 7 to $V_{out}$ through a diode 3.

At this time, when a load current $I_L$ flows, the magnetic flux energy which has been stored in the iron core of the transformer 4 for a time period during which the transistor is in the on state is dissipated. On the basis of the dissipation time (obtained as a function of the load current $I_L$, the input voltage $V_{in}$ and inductance L3 of the winding N1), the off time of the transistor 1 is determined.

Under a condition where the transistor 1 is off, when the magnetic flux stored in the iron core of the transformer 4 is decreased to a fixed value, the transistor 1 is again turned on (time $t_3$), beginning storage of the magnetic flux in the transformer 4. Thus, the transistor 1 repeatedly performs an on-off operation. At this time, the on-off time is controlled by the load current, whereby the output voltage $V_{out}$ is held at a fixed voltage value.

FIG. 2 shows waveforms of signals appearing on respective components of the main circuit of the switching regulator shown in FIG. 1 wherein V3 represents a voltage appearing across winding N3, $I_C$ a current flowing through the winding N1 (a collector current of the transistor 1), and $I_B$ a base current of the transistor 1.

Namely, the switching regulator of the flyback system performs the above-mentioned operation, thereby to hold the output voltage $V_{out}$ constant irrespective of changes of the input voltage $V_{in}$ and the output current $I_L$.

As stated above, the allowed range of the input voltage $V_{in}$ that the switching regulator can control is essentially determined by the circuit constants or the component performance, etc. When the input voltage becomes abnormal, the output voltage becomes abnormal accordingly. For this reason, if the input voltage $V_{in}$ is out of a predetermined range, it is required to announce that the voltage is in abnormal condition to the next stage of the switching regulator by using any suitable method.

Since the primary and secondary sides of the transformer 4 should be kept electrically isolated, it is not preferable to directly detect abnormal condition of the input voltage $V_{in}$. Accordingly, it is generally preferable to detect an abnormal condition of the input voltage $V_{in}$ on the primary side on the basis of the output voltage $V_{out}$ on the secondary side.

In view of this, the above-mentioned switching regulator shown in FIG. 1 is provided with a detection circuit which detects the abnormal condition of the input voltage $V_{in}$ on the basis of the abnormal condition of the output voltage $V_{out}$. In accordance with this detection circuit, the base current of a single output transistor 12 is controlled by a Zener diode 10 to output a signal indicating that the voltage is in abnormal condition.

FIG. 3 is a characteristic curve showing the relationship between the output voltage $V_{out}$ and the input voltage $V_{in}$. The above-mentioned voltage abnormal condition detection circuit operates to detect an abnormal drop below level B of the input voltage $V_{in}$ due to the fact that the output voltage $V_{out}$ has abnormally lowered below level A.

However, this conventional voltage abnormal condition detection circuit fails to detect the abnormal condition of an output voltage obtained when the input voltage $V_{in}$ is between points B and C shown in FIG. 3. Accordingly, the output voltage is continuously delivered to the system of the next stage with it being in an abnormal condition between these points, resulting in the possibility that the operation of the system would become abnormal. For the purpose of allowing the points B and C to be close to each other, it is required that the level A is caused to approach the normal value of the output voltage. However, in the case where the level A is caused to approach the normal value, even if a normal input voltage such as represented by $V_{in} >> C$ could be obtained, when the $V_{out}$ is slightly lowered for any reason, an abnormal condition would be detected. Accordingly, the level A is required to be set to a value below the normal value to some extent.

SUMMARY OF THE INVENTION

An object of the present invention is to provide an abnormal condition detection circuit for a switching regulator which is capable of instantaneously detecting an abnormal drop of the input voltage on the basis of the secondary winding voltage of the transformer.

The present invention provides an abnormal condition detection circuit for a switching regulator which detects an abnormal condition of an input voltage of a switching regulator of the flyback system wherein the abnormal condition detection circuit comprises a peak voltage charging circuit for charging a voltage produced across a secondary winding of a transformer delivering a dc voltage which has been subjected to the constant voltage control through a diode to detect a peak value of the charging voltage, the charging voltage being produced in a direction opposite to the forward direction of the diode, and a voltage comparator for comparing the peak voltage value with a setting value to output an on-off signal depending upon the difference therebetween, thereby making it possible to perform a high speed detection of an abnormal drop of the input voltage and the bad operation of the switching regulator using the secondary voltage of the transformer.

DETAILED DESCRIPTION OF THE PREFERRED EMBODIMENTS

The present invention will be described in detail in connection with preferred embodiments with reference to attached drawings.

Figure 1:
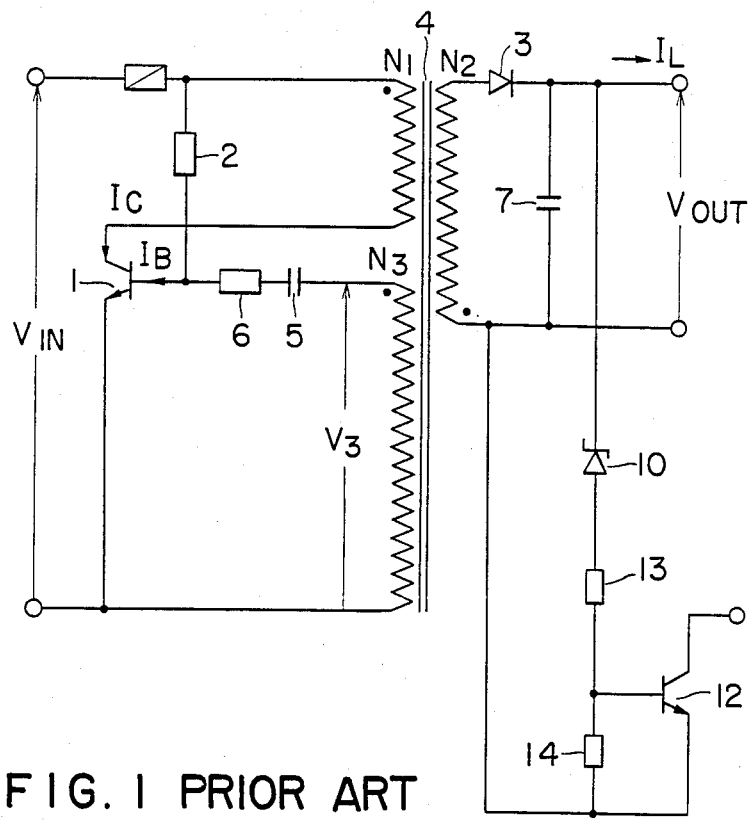
FIG. 1 illustrates one example of a conventional abnormal condition detection circuit for a switching regulator provided in association with the main circuit of the switching regulator.
Figure 2:
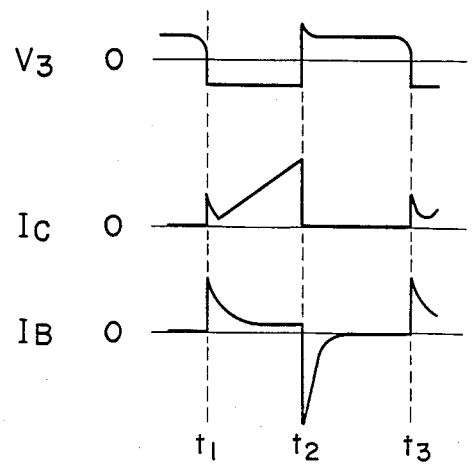
FIG. 2 shows waveforms of circuit components of the main circuit of the switching regulator shown in FIG. 1 for explaining the operational principle of the abnormal condition detection circuit shown in FIG. 1.
Figure 3:
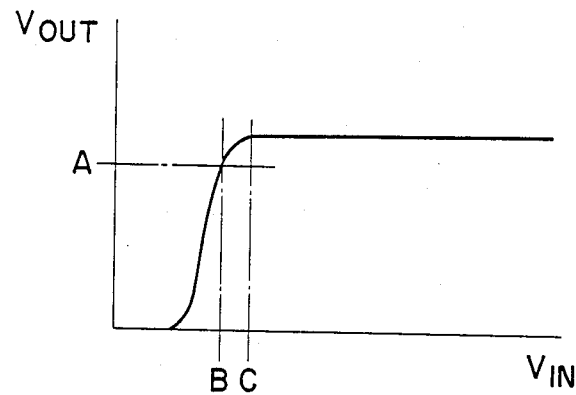
FIG. 3 is a characteristic curve showing the relationship between $V_{out}$ and $V_{in}$ for explaining how the voltage level detective point is determined in the conventional abnormal condition detection circuit shown in FIG. 1.
Figure 4:
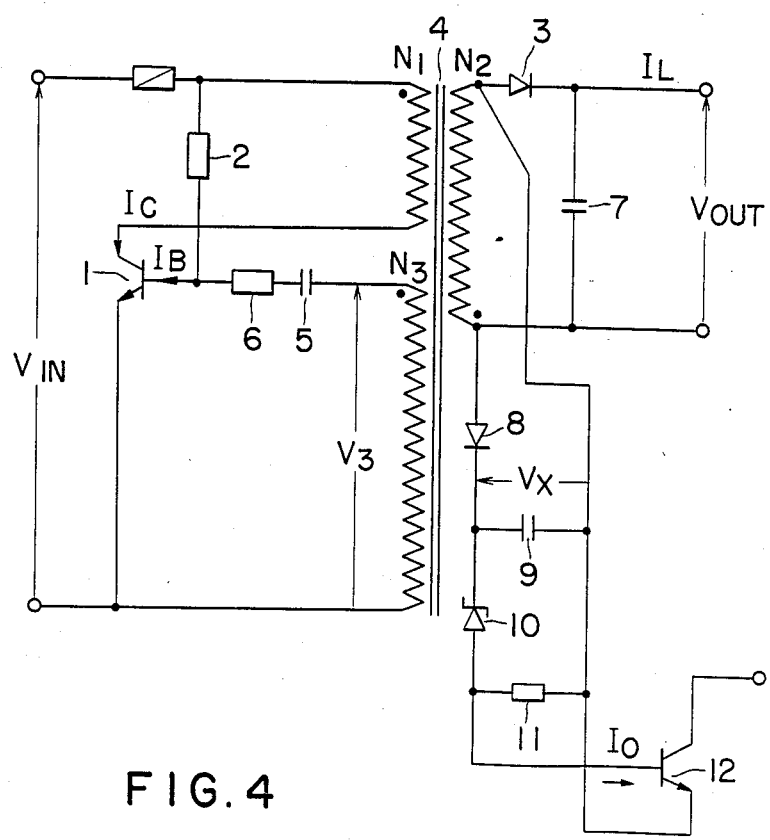
FIG. 4 illustrates one embodiment of an abnormal condition detection circuit for a switching regulator according to the present invention provided in association with the main circuit of the switching regulator.

Initially referring to FIG. 4, there is shown an embodiment of an abnormal condition detection circuit for a switching regulator according to the present invention. The abnormal condition detective circuit in this embodiment is provided with a peak voltage charging circuit comprising a diode 8 and a capacitor 9, which serves to take out a voltage $V_x$ appearing across the winding N2 to the external to instantaneously memorize the voltage $V_x$ value, and a voltage level detection circuit comprising a Zener diode 10 and a resistor 11. Other circuit components constituting the main circuit of the switching regulator are the same as those of the conventional one shown in FIG. 1.

Generally, when a switching regulator of the flyback system is employed, a stabilized dc voltage output is obtained when the transistor 1 is in off state, whereas a voltage $V_x$ appearing across the winding N2 when the transistor 1 is in on state is not utilized as an output. For this reason, the voltage $V_x$ is not stabilized, but varies in proportion to the input voltage $V_{in}$.

Figure 5:
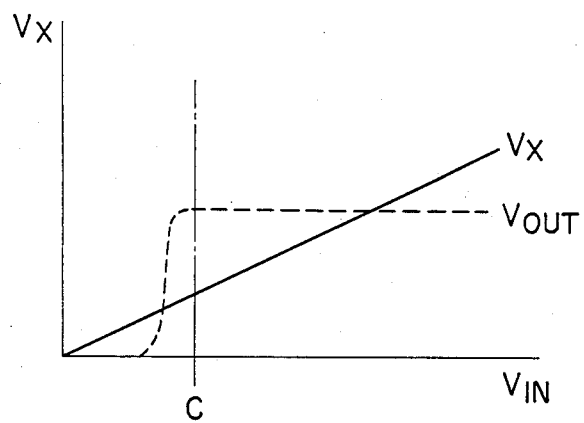
FIG. 5 is a characteristic curve showing the relationships between $V_x$ and $V_{in}$ and between $V_{out}$ and $V_{in}$ for explaining how the voltage level detection point is determined in the present invention.

Namely, the input voltage $V_{in}$ and the voltage $V_x$ (which is determined by the turn ratio of N1 to N2) have the relationship as shown in FIG. 5. It is thus appreciated from this figure that the voltage $V_x$ can be used for detection of an abnormal condition instead of the input voltage $V_{in}$. In view of this, the present invention contemplates detecting an abnormal condition of the input voltage $V_{in}$ using the voltage $V_x$ without detecting an abnormal condition of the input voltage $V_{in}$ using the output voltage $V_{out}$ as has been conducted in the prior art devices.

The Zener diode 10 has a characteristic such that when the voltage value $V_x$ is above a setting value, it is turned on, while when below the setting value, it is cut off. Accordingly, the value of the Zener voltage is selected so that the setting value is equal to point C in FIG. 5.

In FIG. 4, when the transistor 1 is in on state, a current flows through the primary winding N1 of the transformer 4 in a direction of $I_c$. As a result, an induced voltage is produced across the windings N2 and N3 through the iron core of the transformer 4.

The voltage produced across the winding N3 serves as a base current of the transistor 1 through the differentiating circuit comprising the capacitor 5 and the resistor 6. When the charging of the capacitor 5 is completed, no current flows in the circuit, with the result that the base current of the transistor 1 decreases.

The current $I_c$ flowing through the winding N1 continues increasing in proportion to time. However, when the base current of the transistor 1 begins decreasing, the above-mentioned current $I_c$ is unable to increase, with the result that this current $I_c$ also begins decreasing (time $t_2$).

When the current $I_c$ begins decreasing on the basis of the characteristic of the transformer 4, an induced voltage is produced across the winding N3 in a direction opposite to that when the transistor 1 was in on state. This allows a current to flow in a direction which decreases the base current.

When the base current of the transistor 1 is decreased, the current $I_c$ further decreases. By this repetition, the transistor 1 is momentarily cut off (time $t_2$). As a result, an induced electromotive force is produced across the winding N3 in a direction which turns the transistor 1 off.

When the transistor 1 is thus cut off, an output voltage $V_{out}$ is produced across the winding N2 in a direction opposite to the voltage $V_x$ when the transistor 1 was in on state. Thus, this output voltage $V_{out}$ charges the capacitor 7 through the diode 3. By repeatedly carrying out this charging operation, a predetermined output voltage is established.

As previously mentioned, the peak voltage charging circuit including the diode 8 serves to take out a voltage $V_x$ appearing across the winding N2 when the transistor 1 is in on state. This circuit functions to peak-charge the capacitor 9 having a sufficiently small capacity to the value of $V_x$.

Moreover, the voltage level detector comprising the Zener diode 10 and the resistor 11 operates so that when the voltage $V_x$ is above the setting value of the Zener diode 10, it becomes on, while when below the setting value, it becomes off to control an infinitesimal current $I_o$, thus to effect high speed detection of voltage level.

A transistor 12 constitutes a signal output circuit which effects a switching operation with the infinitesimal current $I_o$ as the base current. This circuit functions to amplify the infinitesimal current $I_c$ so that it becomes a signal necessary for the system of the next stage to output a voltage abnormal condition detection signal. Namely, when the switching regulator is in normal condition, the Zener diode 10 is turned on and the transistor 12 is also turned on. However, when abnormal condition occurs ($V_{in} < C$), the Zener diode 10 is cut off and the transistor 12 is also cut off, whereby the occurrence of the abnormal condition is indicated. Further, it is possible to clearly discriminate between the normal and abnormal conditions with the abnormal condition detection point C serving as a borderline therebetween. Accordingly, an erroneous detection as encountered with the prior art devices does not occur.

Other embodiments according to the present invention will now be described in conjunction with FIGS. 6 to 8.

Figure 6:
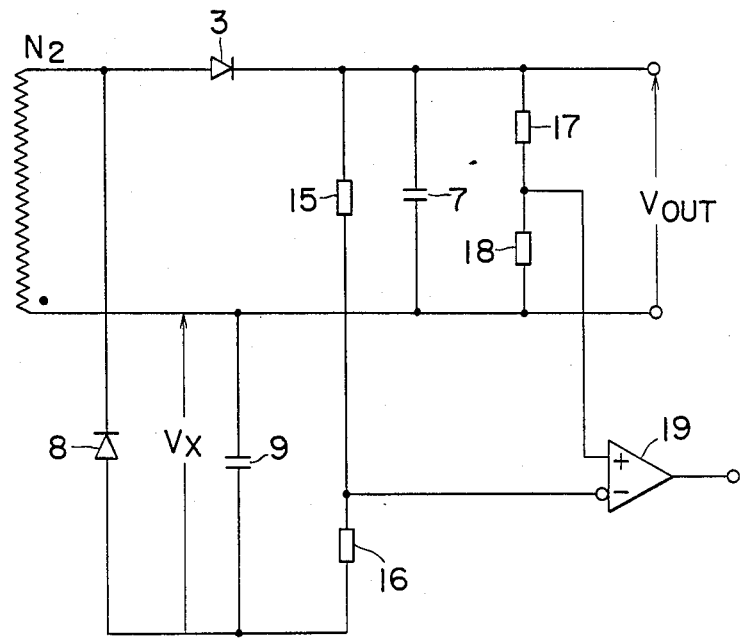
FIGS. 6 to 8 illustrate other embodiments of an abnormal condition detection circuit for a switching regulator according to the present invention, respectively.

FIG. 6 shows a circuit arrangement wherein the Zener diode 10 and the resistor 11 constituting the voltage level detector and the transistor 12 constituting the signal output circuit are replaced by a comparator 19. This circuit performs the same operation as that in FIG. 4. Namely, a voltage proportional to $V_{out}$ (which is obtained by voltage-division using resistors 17 and 18) is delivered to the non-inverting (+) input terminal of the comparator 19, and a voltage proportional to the sum of $V_{out}$ and $V_x$ (which is obtained by voltage-division using resistors 15 and 16) is delivered to the inverting (−) input terminal thereof. Thus, the comparator 19 can detect the magnitude of $V_x$.

Figure 7:
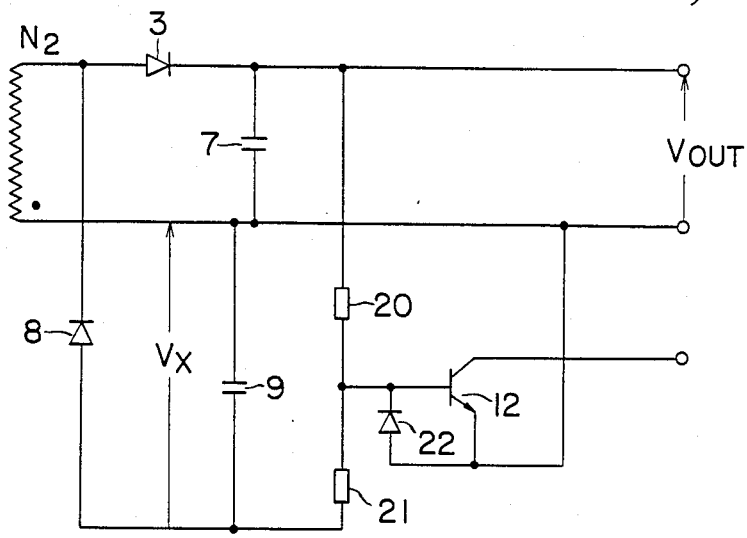

FIG. 7 shows a circuit arrangement wherein $V_x$ and $V_{out}$ are voltage-divided using resistors 20 and 21 instead of the Zener diode 10 and the resistor 11 constituting the voltage level detector, and when $V_x$ is below a setting value, the transistor 12 of the signal output circuit is turned on to detect an abnormal condition of the input voltage.

Figure 8:
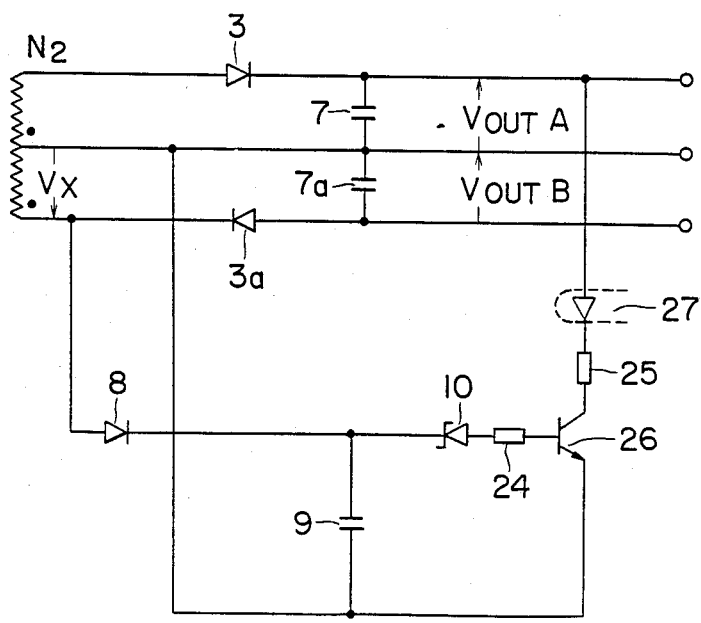

Finally, FIG. 8 shows a circuit arrangement wherein the present invention is applied to a switching regulator of the flyback system which is provided with a center tap at the winding N2, thereby to provide dc stabilized voltages $V_{out}$ A and $V_{out}$ B on the basis iof plus and minus two power supply system. In this embodiment, the transistor 12 of the signal output circuit shown in FIG. 4 is replaced by the combination of a transistor 26 and a photocoupler 27, and the stabilized output voltage $V_{out}$ A is utilized as a power supply for the photocoupler. Thus, the abnormal condition detection signal is provided as a light signal from the photocoupler.

As stated above, the abnormal condition detection circuit for switching regulator according to the present invention is constituted to take out transformer winding voltage $V_x$ proportional to unstabilized input voltage $V_{in}$ to detect voltage abnormal condition, thereby making it possible to announce to the external circuit without delay that the input voltage is in abnormal condition and that the oscillation of the switching regulator is stopped. Thus, this abnormal condition detection circuit is extremely advantageous to improvement in the reliability of devices in which the switching regulator of the flyback system is used.

What is claimed is:

1. A system, comprising:
   a switching regulator of a flyback system, said switching regulator comprising:
   a transformer having a primary winding and a secondary winding,
   a diode connected in series with said secondary winding of said transformer, and
   a capacitor for delivering a dc voltage, said capacitor being connected in parallel with said secondary winding and said diode, and
   an abnormal condition detection circuit for said switching regulator which detects an abnormal condition of an input voltage of the switching regulator of the flyback system, said abnormal condition detection circuit comprising:
   a peak voltage sensing circuit for sensing a peak voltage value produced across said transformer secondary winding in a direction opposite to the forward direction of said diode, and
   a voltage comparator for comparing said peak voltage value with a setting value to output an on-off signal depending upon the difference therebetween.

2. A system as set forth in claim 1, wherein said peak voltage sensing circuit comprises a sensing diode connected in series with said secondary winding, and a capacitor connected in parallel with said secondary winding and said sensing diode.

3. A system as set forth in claim 1, wherein said voltage comparator comprises a Zener diode connected in series with a resistor across an output of said peak voltage sensing circuit.

4. A system as set forth in claim 1, wherein said voltage comparator comprises a comparator circuit having an inverting input and a noninverting input.

5. A system as set forth in claim 1, wherein said voltage comparator comprises a voltage division circuit.

* * * * *